United States Patent
Burgan et al.

[19]

[11] Patent Number: 6,166,621
[45] Date of Patent: Dec. 26, 2000

[54] METHOD AND APPARATUS FOR DISPLAYING A MESSAGE WHICH HAS BEEN RECEIVED

[75] Inventors: John M. Burgan, North Palm Beach; Kenneth S. Lerner, Boca Raton; Keith L. Owens, Lake Worth, all of Fla.

[73] Assignee: Motorola, Inc., Schaumburg, Ill.

[21] Appl. No.: 09/015,406

[22] Filed: Jan. 29, 1998

[51] Int. Cl.[7] .............................. H04Q 1/30; G08B 5/22
[52] U.S. Cl. .................................. 340/311.1; 340/825.44; 340/525; 455/38.4
[58] Field of Search ........................... 340/311.1, 825.44, 340/525; 455/38.1, 38.4

[56] References Cited

U.S. PATENT DOCUMENTS

| | | | |
|---|---|---|---|
| 4,975,694 | 12/1990 | McLaughlin | 340/825.44 |
| 5,107,259 | 4/1992 | Weitzen et al. | 340/825.44 |
| 5,283,570 | 2/1994 | DeLuca et al. | 340/825.44 |

Primary Examiner—Donnie L. Crosland
Attorney, Agent, or Firm—Randi L. Dulaney

[57] ABSTRACT

A communication device such as pager (100) includes a controller (110) which helps decode an incoming message having important information and stores it in memory (112). A user control (116) such as a "Read" control switch is then used to display the message on the display (106). In accordance with one aspect of the present invention, controller (110) locates the important information found in the stored message and causes it to be displayed on one or more stationary display lines (416) which do not change even when the user scrolls through different display screens (408–412) to read the entire message. In an alternate embodiment of the invention, the pager controller (110) will have stored a set of rules which will help it locate the important information (e.g., telephone number, etc.) found in a stored message. Once the important information is found, the controller (110) will cause this information to be displayed as a stationary display line when displaying the message in one or more display screens.

9 Claims, 4 Drawing Sheets

METHOD AND APPARATUS FOR DISPLAYING A MESSAGE WHICH HAS BEEN RECEIVED

FIELD OF THE INVENTION

This invention relates in general to electronic devices and in particular to communication devices which have a display.

BACKGROUND OF THE INVENTION

When receiving information in a communication device such as a pager, it is sometimes helpful if a portion of the received data is highlighted to the user. As an example, finding important information, such as a telephone number, in a long alphanumeric page can sometimes be difficult since the user typically has to scroll through several display screens to read the entire message. If a long message is received which requires the recipient to call a certain telephone number found within the message, it would be beneficial if the telephone number was somehow highlighted for the recipient. Other types of messages which include important information would also benefit from a method and apparatus which could determine what information within a message is important, and somehow highlight the information in the communication device display when the message is being displayed.

DESCRIPTION OF THE PREFERRED EMBODIMENT

Figure 1:
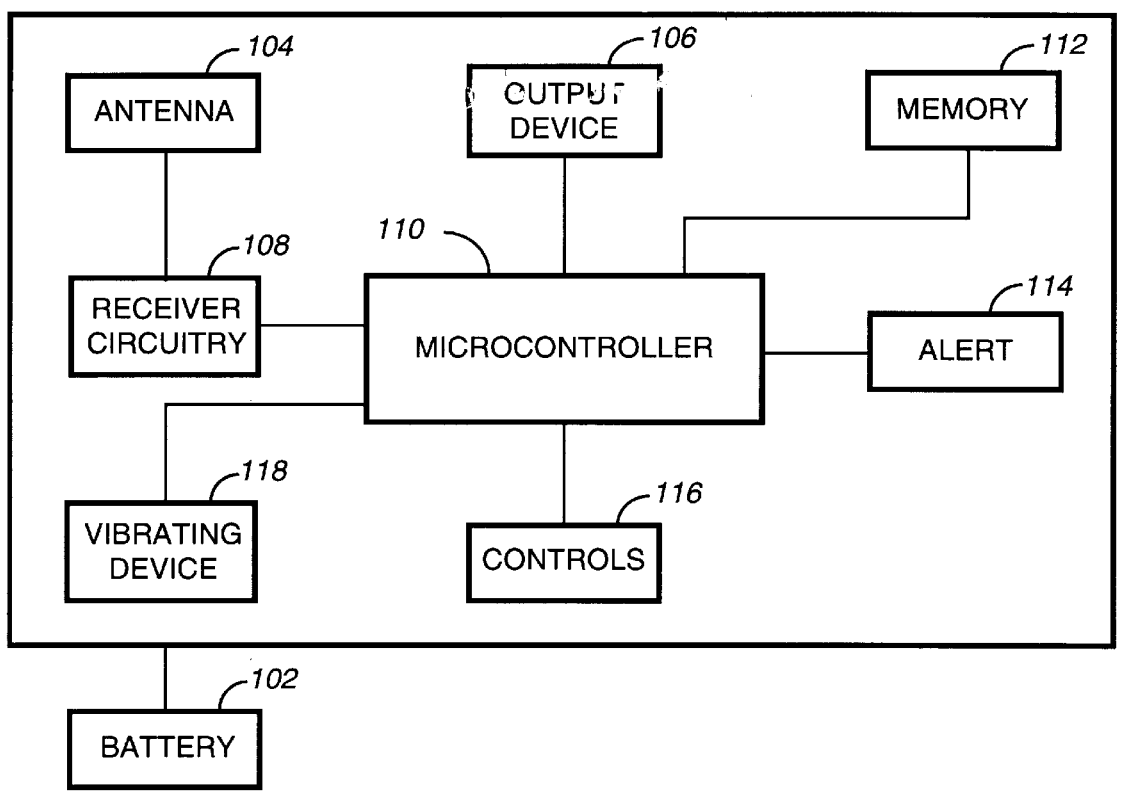
FIG. 1 shows a block diagram of a pager in accordance with the preferred embodiment of the invention.

Referring now to the drawings and in particular to FIG. 1, a simplified block diagram of a communication device, such as a pager 100 in accordance with the invention is shown. Pager 100 includes a primary power supply 102 which can preferably take the form of a nonrechargeable battery, such an alkaline battery, or a rechargeable battery, such as a nickel-cadmium (NiCd) battery. Battery 102 provides power to all of the pager's circuitry. The pager 100 further comprises an antenna 104 that receives a radio frequency (RF) modulated selective call signal and provides the signal to a conventional receiver circuitry 108 for demodulation thereby. A microcontroller or microprocessor 110 processes the demodulated signal to decode an address and optional message data contain therein.

Once recovered, the message data may be stored in the memory or storage area 112 (message buffer) for subsequent presentation by an output device 106, such as a liquid crystal display 106 or an audio transducer 114. Memory 112 can comprise random access memory (RAM) located internal and/or external to controller 110. In normal operation, the pager's controller 110 compares a decoded address contained in the received signal with a predetermined address or addresses stored in memory to determine if the message is for that particular pager. The user is alerted by an alert mechanism 114 that a message has been received if the decoded address correlates with one of the predetermined address or addresses. The alert mechanism 114 typically takes the form of an audio transducer, etc. Alternatively, the pager 100 can vibrate instead of sounding an audible alarm upon receipt of an incoming message if equipped with a vibrating device 118. If the received signal contains optional message data, the display 106 will present the message automatically on the display or when manually selected, by user actuated controls 116 which comprise switches, etc.

Figure 2:
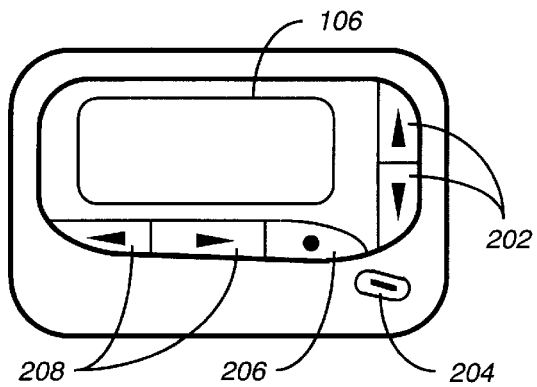
FIG. 2 shows a front view of a pager showing the pager's display and controls in accordance with the preferred embodiment of the invention.

In FIG. 2, a front view of pager 100 is shown. In the particular pager shown, the user controls 116 include left/right directional buttons 208, up/down directional buttons 202, a read/reset/power on button 204, and a function/select button. The user controls 116 allows the pager user to set all of the pager's user selectable features and functions, and allows the user to review and delete the messages which have been received. Display 106 comprises a multi-line display capable of displaying multiple lines of information.

Figure 3:
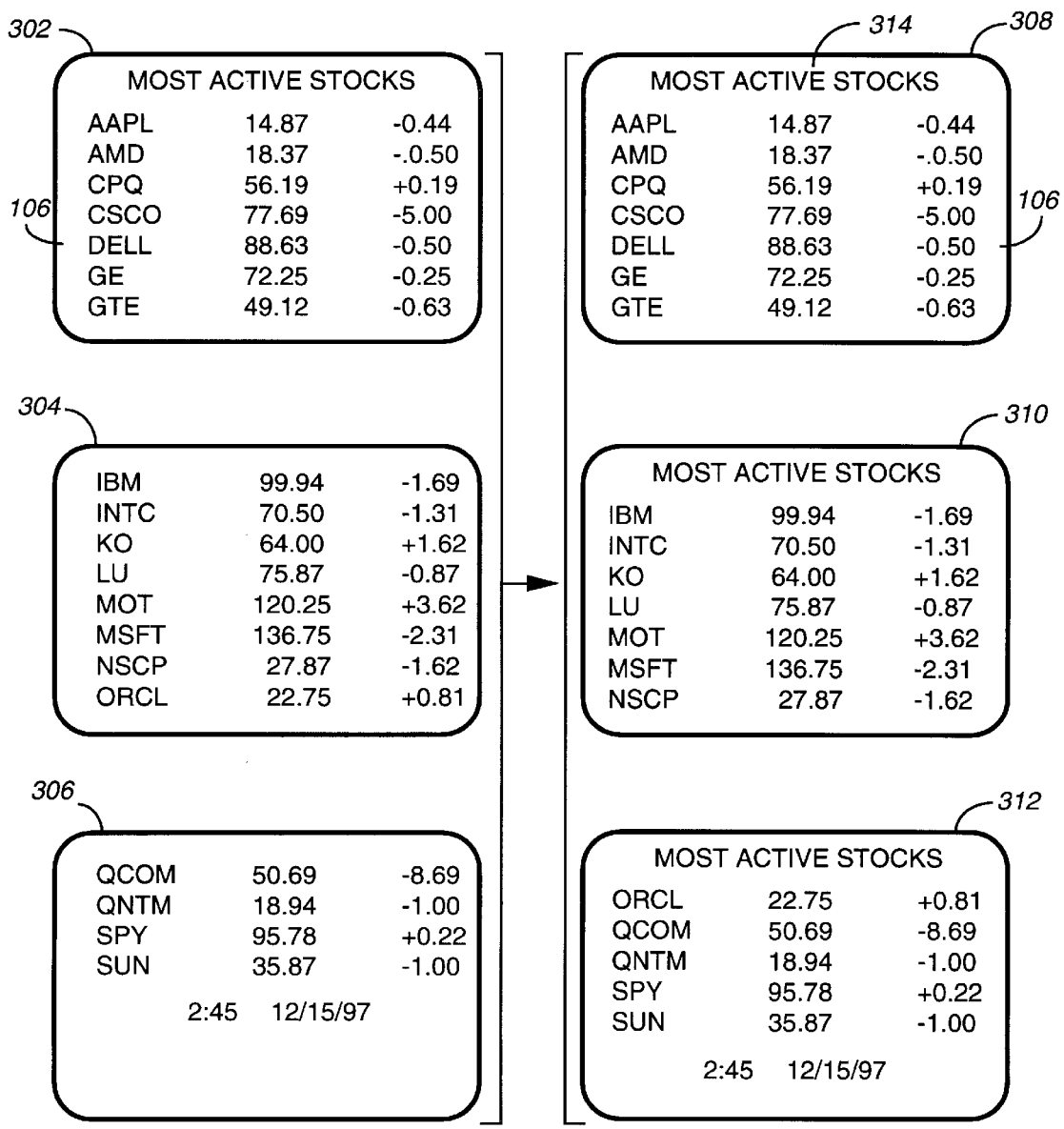
FIG. 3 shows a pager displaying a message in both a conventional fashion and in accordance with the preferred embodiment of the invention.

Referring now to FIG. 3, a series of display screens for pager 100 are shown. Display screens 302–306 show the presentation of news service information, such as stock information, in a prior art fashion on the pager's display 106. As highlighted on display screen 302, the title of the message, "MOST ACTIVE STOCKS", is only shown at the start of the message on display screen 302 in accordance with the prior art. Display screens 304 and 306 which are reached by activating the pager's message scroll switch 202 do not provide the pager user with any information as to what the screens are meant to display. If the message had been longer, a user scrolling through the different display screens may be required to scroll back to the first display screen 302 to remember what the information received was meant to convey.

In accordance with the preferred embodiment of the invention, if the same message shown on display screens 302–306 were received, the title, "MOST ACTIVE STOCKS", is kept stationary on a predetermined area of display 106 such as the first line of the display, even as the user scrolls through all of the display screen 308–312. This helps highlight what the information found in the message is about, even if the message requires more than one display screen to fully view the contents of the entire message.

Figure 4:
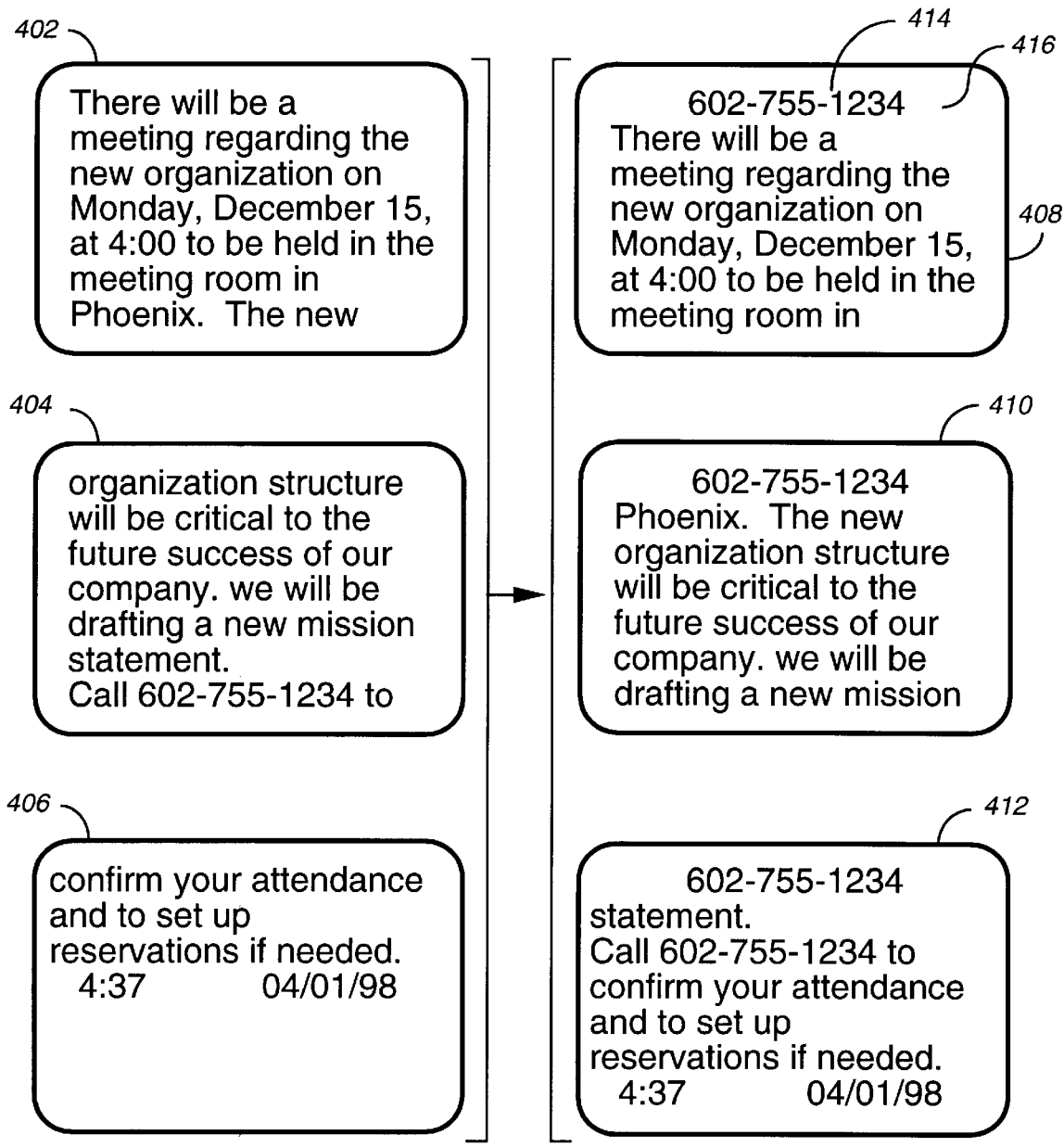
FIG. 4 shows a pager displaying a message in both a conventional fashion and in accordance with the preferred embodiment of the invention.

In FIG. 4, display screens 402–406 highlight the prior art reception of a long message which includes a telephone number. While display screens 408–412 highlight the same message content being received using the present invention. As shown in display screens 408–412, the important information found in the message 414, in this particular case, telephone number "602-755-1234", is highlighted on the first display line (display field) 416 throughout the entire message. With the present invention, the user receiving this message can quickly find the telephone number which was received in the message without having to scroll to a particular display screen as would be the case with the prior art shown in display screens 402–406.

The present invention can be implemented in several ways, either at the communication system end and/or at the communication device. In the case of a paging system, the paging protocol (e.g., FLEX™ etc.) would accommodate a control character being inserted at the beginning and/or end of the "important information" in the page. A person sending a page could perform this operation by typing the control character at the paging terminal. A service provider could do this similarly by taking incoming pages, finding what the service provider deems as important information, and adding the control character(s) in the appropriate locations within the message.

Taking the particular message shown in FIG. 3 as an example, the important information, "MOST ACTIVE STOCKS" would be transmitted to pager 100 by the paging system using control characters. For example, the control character used by the paging system and pager 100 could be ASCII character "SO" (shift out) having a hexadecimal value of 0E. In this example, the important information would be transmitted with the control character added in front and in back of the important information. In the preferred embodiment, the control characters (0E) are stored along with the rest of the message in one of the pager's message buffers once the message is received by the pager 100. When the message is caused to be displayed either by the user or automatically by the pager, the control characters are stripped off the message by controller 110. The important information is then placed in the designated line or lines of the display 106 which have been chosen to display the important information. Pager 100 would be preloaded with the control character(s) that are to be used to decode the important information from any message which is received by the pager 100.

Preferably, the important information is displayed in the same predetermined area on the display 106, even if the user has to scroll through several display screens in order to view the contents of the entire message. Different types of characters can be used as the "control character(s)", preferably however, the control characters are chosen to be characters that typically will not appear as part of the messages which are transmitted in the system to pager 100. It is worth noting that less than or more than two control characters can be utilized to help decode the important information depending on the particular communication system requirements. Also, the pager could be loaded with more than one particular control character.

The pager 100 upon receiving a message, decodes the entire message along with the control character(s). The information highlighted by the control character(s) is then displayed in a stationary fashion as previously discussed. The important information can be highlighted in one or more specific lines (or areas) within the display 106. In very long messages, the important information could also be shown on alternate or other combination of display screens, every "X" screen, etc. in order to allow more room for the message to be displayed, although preferably, the important information is shown in all of the display screens which are required to be used to display an entire message. The display line or lines (display field) used to display the "important information", although preferably are the top most display line or lines on the display 106, could be any of the lines on the display 106. If a color display is used, the present invention can highlight the important information by causing the important information to be displayed in a specific color or contrasting color in order to highlight the important information from the rest of the message.

In a second design alternative, instead of the paging system adding control characters to highlight the important information, the pager 100 itself determines what the important information is that is being received. As an example, the pager 100 could look for the first phone number in a message (page). A decoding algorithm (decoding rule) stored in the pager 100 could identify the phone number by looking for a sequence of numbers separated by a dash in typical phone number format, or simply by looking for the first group of consecutive numbers (e.g., typically 4, 7, 10 or more numbers in a row). Once the pager 100 has located the important information within a particular message using the particular decoding rule stored in the pager 100, it will highlight the important information in a stationary fashion as discussed above.

In a third design alternative, the pager user determines what information is to be considered important information. As particular examples, important information could be classified as the first telephone number appearing in the page as mentioned above, any information following a particular company name for a couple of word lengths (e.g., for getting an important stock quote out of a paged list), a customer-defined "important string" found in a page, etc. The identifying criteria such as the "important string" or particular company name can be set up using the pager's programming software and stored in the pager, or can be entered directly by the user using a user defined interface sequence. This is especially beneficial for communication devices such as pagers having full keyboards. In this particular case the communication device would be programmed with a decoding rule which would cause it to display a company name (e.g., "Motorola") in a prominent fashion as shown in FIGS. 3 and 4 anytime it appears in a received message and is matched to the company name stored in the pager. These decoding rules can be stored in nonvolatile memory such in an electrically erasable programmable read-only memory (EEPROM) and compared with the messages which are received.

In a fourth design alternative, the important information found in a received message is determined by the communication service (e.g., pager service) provider with the communication devices (e.g., pagers) programmed accordingly. As an example of this alternative design, a paging service provider allows the pager's software to display important information only when the service provider does not send control characters in a particular message (page). This alternative can be thought as a design rule override. This design alternative is a combination of the first design and the third design alternative mentioned above. In this case, even if a company name within a received message matches a name stored in the pager as a decoding rule, the pager will not display this information as important information per the invention if the message includes control characters. In this case, the information found within the control characters would be the information which is highlighted in the display as important. Other combinations of using preset decoding rules and control characters transmitted by the communication system can also be used with the present invention.

Figure 5:
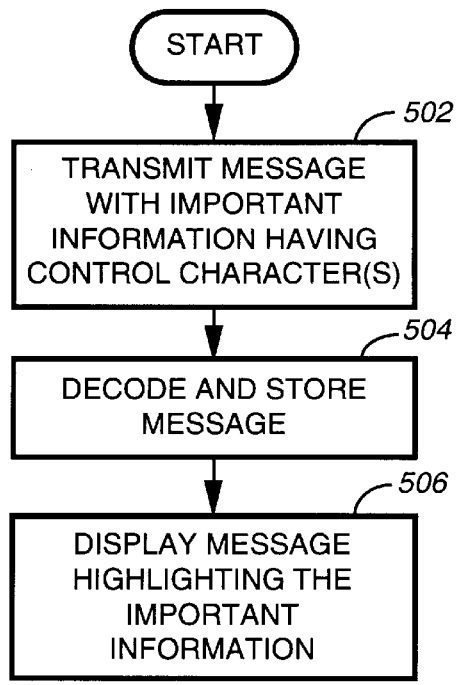
FIG. 5 shows a flowchart which highlights the steps taken in accordance with one embodiment of the invention.

Referring now to FIG. 5, there is shown a flowchart highlighting he steps taken in accordance with one of the above mentioned embodiments of the present invention. In this particular embodiment, the paging system transmits a message to the pager 100 in step 502. The message includes one or more special control characters which inform pager 100 what the important information is within the message. In step 504, the pager 100 stores the message. The message is displayed in step 506 either by the user pressing the "read message" control 204, or the pager automatically displaying the message upon the receipt of the message. Controller 110 removes the control characters from the message before displaying the message and the important information is displayed in a prominent area within display 106. For example, the first display line 416.

Figure 6:
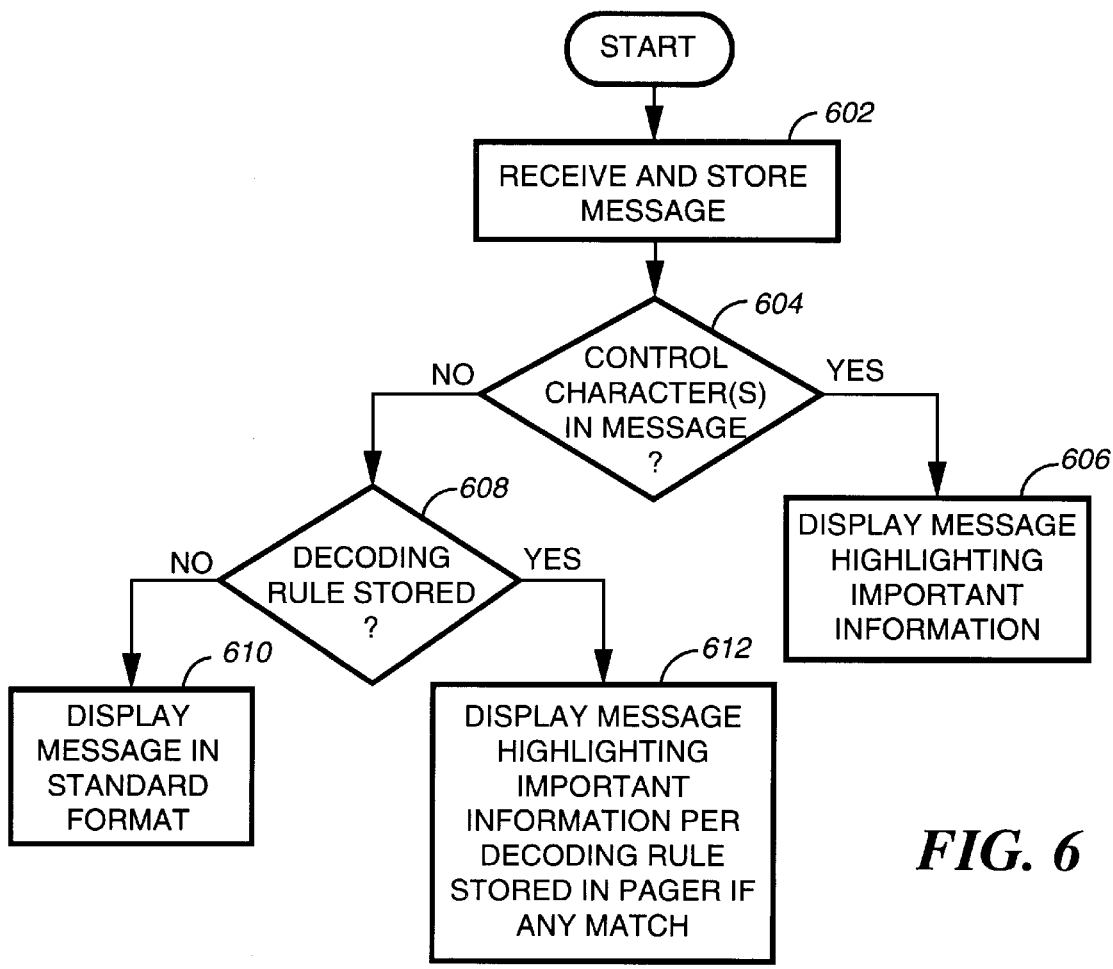
FIG. 6 shows a flowchart which highlights the steps taken in accordance with an alternate embodiment of the invention.

In FIG. 6, a flowchart highlighting another embodiment of the invention as described previously above is shown. In this embodiment, a message is received and stored in pager 100 in step 602. In step 604, it is determined if the message has any control character(s) located within the message. If control characters are found, in step 606 the message is displayed with the important information which has been decoded using the control characters being highlighted. If no control characters are found in step 604, it is then determined in step 608 if pager 100 has stored within the pager 100 any decoding rules for locating important information. If no decoding rules are stored in the pager 100, the message is displayed in a conventional fashion without highlighting any information in step 610. If however in step 608 a decoding rule is stored in the pager 100 besides control character information, the decoding rule is used to determine if important information resides within the message in step 612. If a match if found using the decoding rule(s), the information which was matched with the rule(s) is highlighted as important information per the invention when the message is displayed.

Although the preferred embodiment has been discussed using a paging system and pager, other communication devices which receive messages such as cellular telephones, land mobile telephones, etc. can benefit from the present invention. While the preferred embodiments of the invention have been illustrated and described, it will be clear that changes, variations, substitutions and equivalents will occur to those skilled in the art without departing from the spirit and scope of the present invention as defined by the appended claims.

What is claimed is:

1. A method for displaying important information found within a message which is received by a communication device having a display, the communication device is capable of displaying the message in multiple display screens if the message is longer than that which can be displayed on the display in a single display screen, comprising the steps at the communication device of:

receiving the message;

locating the important information within the message, wherein the communication device determines where the important information is within the message by decoding at least one control character which is included within the message; and displaying the important information in a predetermined location of the display.

2. A method as defined in claim 1, wherein the control character is located at the beginning and the end of the important information, and the communication device uses the control characters to locate the important information within the message but does not display the control characters.

3. A method for displaying important information found within a message which is received by a communication device having a display, the communication device is capable of displaying the message in multiple display screens if the message is longer than that which can be displayed on the display in a single display screen, comprising the steps at the communication device of:

receiving the message;

locating the important information within the message, wherein the communication device locates the important information within the message by using a predetermined decoding rule stored in the communication device; and displaying the important information in a predetermined location of the display.

4. A method as defined in claim 3, wherein the decoding rule comprises locating a series of numbers within the message.

5. A method as defined in claim 3, wherein the decoding rule comprises finding a match between a predetermined string of information stored in the pager with the message, and displaying the matching string as the important information in the display.

6. A communication device for displaying important information found within a message which is received by the communication device, the communication device having a display which is capable of displaying the message in multiple display screens if the received message is longer than that which can be displayed in a single display screen, the communication device comprising:

a receiver for receiving a message;

a display; and a controller coupled to the receiver, the controller displaying the important information found in the message in a predetermined area within the display, wherein the controller determines where the important information is within the message by decoding a control character which is included in the message to highlight the important information.

7. A communication device for displaying important information found within a message which is received by the communication device, the communication device having a display which is capable of displaying the message in multiple display screens if the received message is longer than that which can be displayed in a single display screen, the communication device comprising:

a receiver for receiving a message;

a display;

a controller coupled to the receiver, the controller displaying the important information found in the message in a predetermined area within the display;

a memory coupled to the controller, the memory has stored therein a decoding rule; and the controller uses the decoding rule to determine where the important information is within the message.

8. A communication device as defined in claim 7, wherein the controller does not use the decoding rule stored in the memory to determine where the important information is within the message if the message includes a control character.

9. A communication device as defined in claim 7, wherein the decoding rule comprises matching a particular string of information stored in the memory with the message in order to determine if the particular string of information is located within the message.

* * * * *